(12) United States Patent
Friedrich et al.

(10) Patent No.: US 9,014,325 B2
(45) Date of Patent: Apr. 21, 2015

(54) NUCLEAR FUEL ASSEMBLY TIE PLATE, UPPER NOZZLE AND NUCLEAR FUEL ASSEMBLY COMPRISING SUCH A TIE PLATE

(75) Inventors: Erhard Friedrich, Eckental (DE); Dieter Umlauft, Neunkirchen (DE); Dirk Blavius, Erlangen (DE); Klaus Kurzer, Igensdorf (DE)

(73) Assignee: Areva NP, Courbevoie (FR)

( * ) Notice: Subject to any disclaimer, the term of this patent is extended or adjusted under 35 U.S.C. 154(b) by 0 days.

(21) Appl. No.: 13/822,525

(22) PCT Filed: May 11, 2012

(86) PCT No.: PCT/EP2012/058781
§ 371 (c)(1),
(2), (4) Date: Jun. 10, 2013

(87) PCT Pub. No.: WO2012/159904
PCT Pub. Date: Nov. 29, 2012

(65) Prior Publication Data
US 2014/0086377 A1    Mar. 27, 2014

(30) Foreign Application Priority Data

May 20, 2011 (EP) .................................... 11305623

(51) Int. Cl.
*G21C 3/34* (2006.01)
*G21C 3/322* (2006.01)
(Continued)

(52) U.S. Cl.
CPC *G21C 3/322* (2013.01); *G21C 3/34* (2013.01); *G21C 3/352* (2013.01); *G21C 3/3206* (2013.01); *G21C 3/3315* (2013.01); *Y02E 30/38* (2013.01)

(58) Field of Classification Search
CPC ...... G21C 3/3206; G21C 3/3315; G21C 3/34; G21C 3/3416; G21C 3/352; G21C 3/356; G21C 3/3563
USPC .......................................... 376/434–449, 462
See application file for complete search history.

(56) References Cited

U.S. PATENT DOCUMENTS 3,068,163 A * 12/1962 Currier, Jr. et al. ........... 376/442
3,379,618 A *  4/1968 Frisch .......................... 376/442
(Continued)

FOREIGN PATENT DOCUMENTS

| GB | 1 362 562 A | 8/1974 |
| JP | 48-17095 A | 3/1973 |

(Continued)

OTHER PUBLICATIONS

International Search Report for corresponding International Application PCT/EP2012/058781.

*Primary Examiner* — Jack W Keith
*Assistant Examiner* — Sharon M Davis (57) ABSTRACT

A nuclear fuel assembly tie plate is provided. The nuclear fuel assembly tie plate is formed by intersecting strips delimiting between them tubular guide cells each for allowing a fuel rod to extend through the tie plate. The strips delimit between them tubular flow cells separate from the guide cells, each flow cell for allowing coolant flow through the tie plate. Guide cells and flow cells are arranged at nodes of a lattice defined by a repeating pattern comprising four corner nodes in a square lattice arrangement and a central node at the center of the four corner nodes, with one guide cell at each corner nodes, separated by a pair of parallel spaced strips intersecting a pair of parallel spaced strips, the two pairs of strips delimiting a four-walled central flow cell at the center node.

13 Claims, 6 Drawing Sheets

(51) Int. Cl.
*G21C 3/33* (2006.01)
*G21C 3/352* (2006.01)
*G21C 3/32* (2006.01)

(56) References Cited

U.S. PATENT DOCUMENTS 4,411,862 A * 10/1983 Leclercq et al. ............ 376/442
5,434,898 A * 7/1995 Barkhurst ................... 376/438

2007/0183556 A1 8/2007 Labarriere et al.
2009/0060114 A1 3/2009 DeFilippis
2010/0172460 A1 7/2010 Yoon et al.

FOREIGN PATENT DOCUMENTS

JP 54-049491 A 4/1979
JP 54-101083 A 8/1979
JP 54-145886 A 11/1979

* cited by examiner

NUCLEAR FUEL ASSEMBLY TIE PLATE, UPPER NOZZLE AND NUCLEAR FUEL ASSEMBLY COMPRISING SUCH A TIE PLATE

The present invention relates to a tie plate for use in a nuclear fuel assembly and more particularly in an upper nozzle of a fuel assembly for a boiling water reactor (BWR).

BACKGROUND

A nuclear fuel assembly for boiling water reactor (BWR) conventionally comprises a bundle of fuel rods and at least one tubular water channel encased in a tubular fuel channel. Each water channel replaces at least one fuel rod in the bundle.

Each fuel rod comprises a tubular cladding receiving a stack of nuclear fuel pellets and closed at its ends by end plugs.

The fuel assembly comprises a plurality of spacer grids distributed along the fuel assembly for maintaining the fuel rods transversely in spaced relationship. Each spacer grid comprises guide cells through each of which a fuel rod usually extends.

The fuel assembly comprises an upper nozzle at the upper end of the fuel channel and a lower nozzle at the lower end of the fuel channel. Fuel rods extend from the upper nozzle to the lower nozzle. Each nozzle has guide cells each for receiving a respective fuel rod end plug and channels for allowing coolant to flow through the nozzle.

In operation, the fuel assembly is oriented vertically in a nuclear reactor core and a coolant is caused to flow upwardly between the fuel rods. The coolant flows in the water channel and the fuel channel, from lower end to upper end of the fuel assembly. Coolant enters the fuel channel through the lower nozzle and exits the fuel channel through the upper nozzle.

SUMMARY OF THE INVENTION

An object of the invention is to provide an upper nozzle tie plate limiting the pressure drop of the upper nozzle while being of sufficient strength.

To this end, a tie plate is provided which is formed by intersecting strips delimiting between them tubular guide cells each for allowing a fuel rod to extend through the tie plate, wherein the strips delimit between them tubular flow cells separate from the guide cells, each flow cell for allowing coolant flow through the tie plate and wherein guide cells and flow cells are arranged at nodes of a lattice defined by a repeating pattern comprising four corner nodes in a square lattice arrangement and a central node at the center of the four corner nodes, with one guide cell at each corner nodes, separated by a pair of parallel spaced strips intersecting a pair of parallel spaced strips, the two pairs of strips delimiting a four-walled central flow cell at the center node.

The tie plate may comprise one or several of the following features, taken in isolation or in any technically feasible combination:

- the central flow cell has a cross-section area superior to that of each guide cell;
- each guide cell has a square-shaped cross-section;
- each central flow cell has a square-shaped cross-section;
- the repeating pattern is a 3×3 array of nodes in a square or rectangular lattice arrangement with the four guide cells at corner nodes, the central flow cell at the center node and four intermediate flow cells at four intermediate side nodes between the corner nodes;
- each intermediate flow cell has a cross-section area superior to that of the guide cells;
- each intermediate flow cell has a rectangular-shaped cross-section;
- the guide cells and flow cells positioned at the nodes of the repeating pattern are delimited between a group of four parallel strips intersecting a group of four parallel strips, wherein in each group the spacing between the pairs of strips delimiting the central flow cell between them is superior to the spacing between the pair of strips delimiting the guide cells between them;
- it comprises strips having planar guide cell portions delimiting guide cell side walls;
- it comprises strips having guide cell portions delimiting guide cell side walls curved inwardly with respect to the guide cell;
- it comprises strips having guide cell portions delimiting guide cell side walls curved outwardly with respect to the guide cell;
- it comprises strips having guide cell portions delimiting guide cell side walls provided with dimples protruding from the guide cell portion inwardly in the corresponding guide cell.

A nuclear fuel upper nozzle is also provided comprising a tie plate as defined above.

A nuclear fuel assembly is also provided comprising a tie plate as defined above.

A nuclear fuel assembly is also provided comprising an upper nozzle as defined above and a bundle of fuel rods wherein at least one guide cell receives a fuel rod with a transverse clearance between the fuel rod and the guide cell side walls.

BRIEF SUMMARY OF THE DRAWINGS

The invention and its advantages will be better understood on reading the following description given solely by way of example and with reference to the appended drawings, in which.

DETAILED DESCRIPTION

Figure 1:
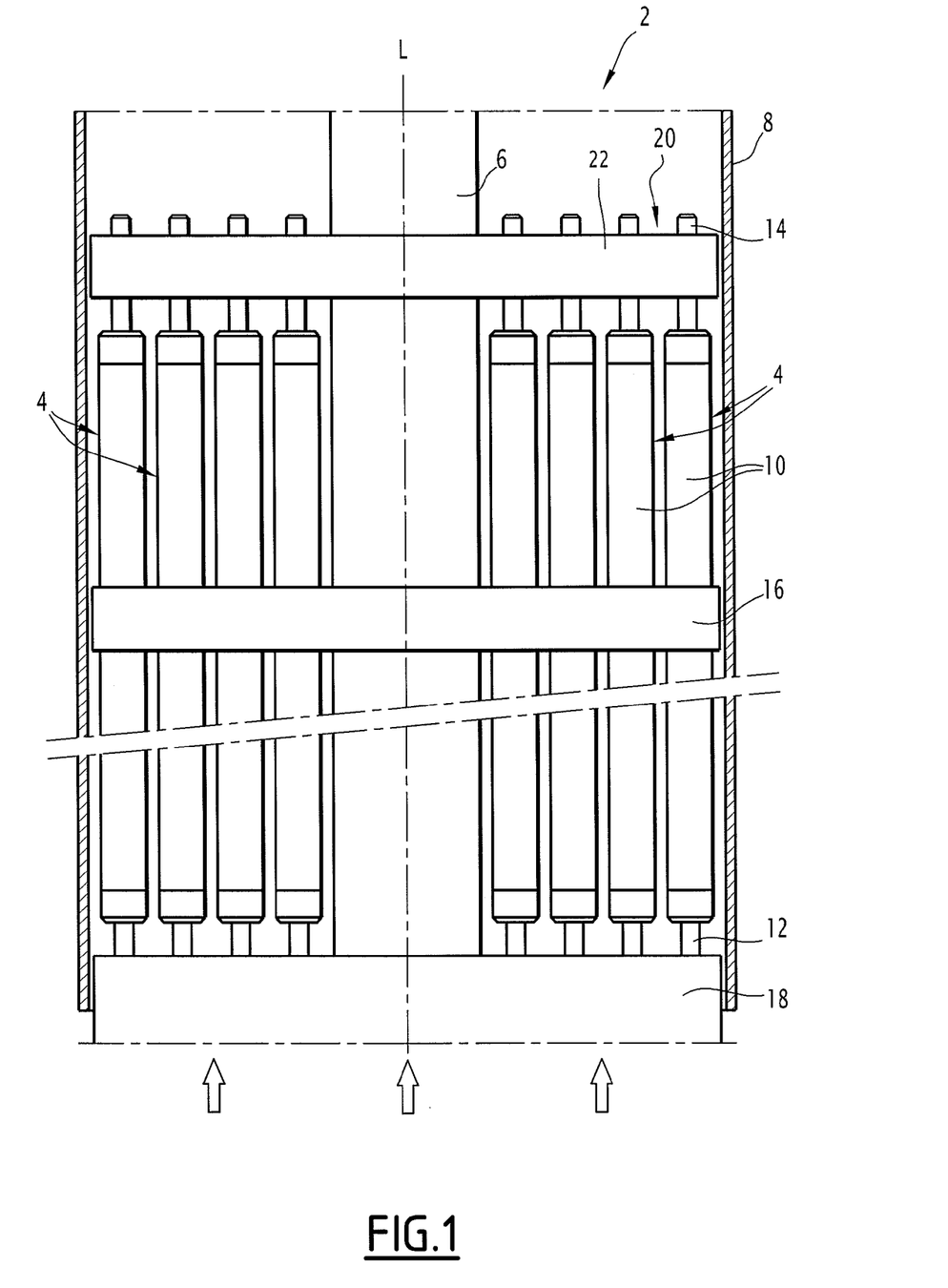
FIG. 1 is a sectional side view of a nuclear fuel assembly comprising an upper nozzle having a tie plate according to the invention.

As illustrated on FIG. 1, the nuclear fuel assembly 2 is elongated along a longitudinal central axis L.

In use, the fuel assembly 2 is placed in the core of a nuclear reactor with the axis L extending substantially vertically. In the following, the terms "lower" and "upper", "axial" and "transverse" refer to the position of the fuel assembly 2 in the reactor.

The fuel assembly 2 is for a boiling water reactor (BWR) and comprises a bundle of part-length (not shown) and fulllength nuclear fuel rods 4 and a tubular water channel 6 encased in a tubular fuel channel 8. The fuel rods 4, the water channel 6 and the fuel channel 8 extend longitudinally parallel to axis L.

Each fuel rod 4 comprises a tubular cladding 10 filled with stacked nuclear fuel pellets and closed at its lower end and upper end by a lower end plug 12 and an upper end plug 14 respectively. The fuel rods 4 are arranged in a lattice and the water channel 6 replaces some of the fuel rods 4 in the lattice.

The fuel assembly 2 comprises fuel rod supporting spacer grids 16 distributed along the fuel rods 4, only one spacer grid 16 being illustrated on FIG. 1. The function of the spacer grids 16 is to maintain the fuel rods 4 axially and transversally with a transverse spacing between them.

The fuel assembly 2 comprises a lower nozzle 18 and an upper nozzle 20 at the lower end and the upper end respectively of the fuel channel 8. The fuel rods 4 extend from the lower nozzle 18 to the upper nozzle 20.

In a boiling water reactor fuel assembly, the fuel assembly bottom nozzle and upper nozzle are configured to aid in channeling the coolant through the fuel assembly during operation, the bottom nozzle accepting coolant flow and the upper nozzle discharging the coolant from the fuel assembly.

A BWR lower nozzle typically includes an inlet nozzle, a lower tie plate and a transition region between the inlet nozzle and the lower tie plate whereby coolant entering the inlet nozzle flows upwardly successively through the transition region, through the tie plate and about the individual fuel rods secured or supported freely at their lower ends by the lower tie plate. A debris filter is typically included in the lower nozzle, usually below the lower tie plate, in the transition zone.

The lower nozzle 18 is adapted to position the fuel assembly 2 in the lower core plate, to allow coolant to flow through the lower nozzle 18 to enter the fuel channel 8, to catch debris and to support the fuel rods 4.

A BWR upper nozzle typically includes a tie plate with holes providing an exit for coolant to flow out of the fuel assembly and a handle bar. One or more of the water and/or fuel rods are usually used as structural members to be rigidly fasten by some means to both the lower and upper tie plates for the purpose of lifting the BWR fuel assembly via the handle bar and maintaining a fixed distance between the lower and upper nozzles. The upper nozzle is usually connected to the fuel channel so that the fuel channel is lifted out of the nuclear reactor core along with the fuel assembly. The upper nozzle and the fuel channel can be disconnected allowing the fuel channel to be lifted off the fuel assembly. The upper end plugs of the fuel rods typically extend through tie plate holes which restrain the end plugs laterally.

The upper nozzle 20 is adapted to allow coolant to flow through the tie plate 22 to exit the fuel channel 8 and to allow the upper end plugs 14 of the fuel rods to extend through the tie plate 22.

Figure 2:
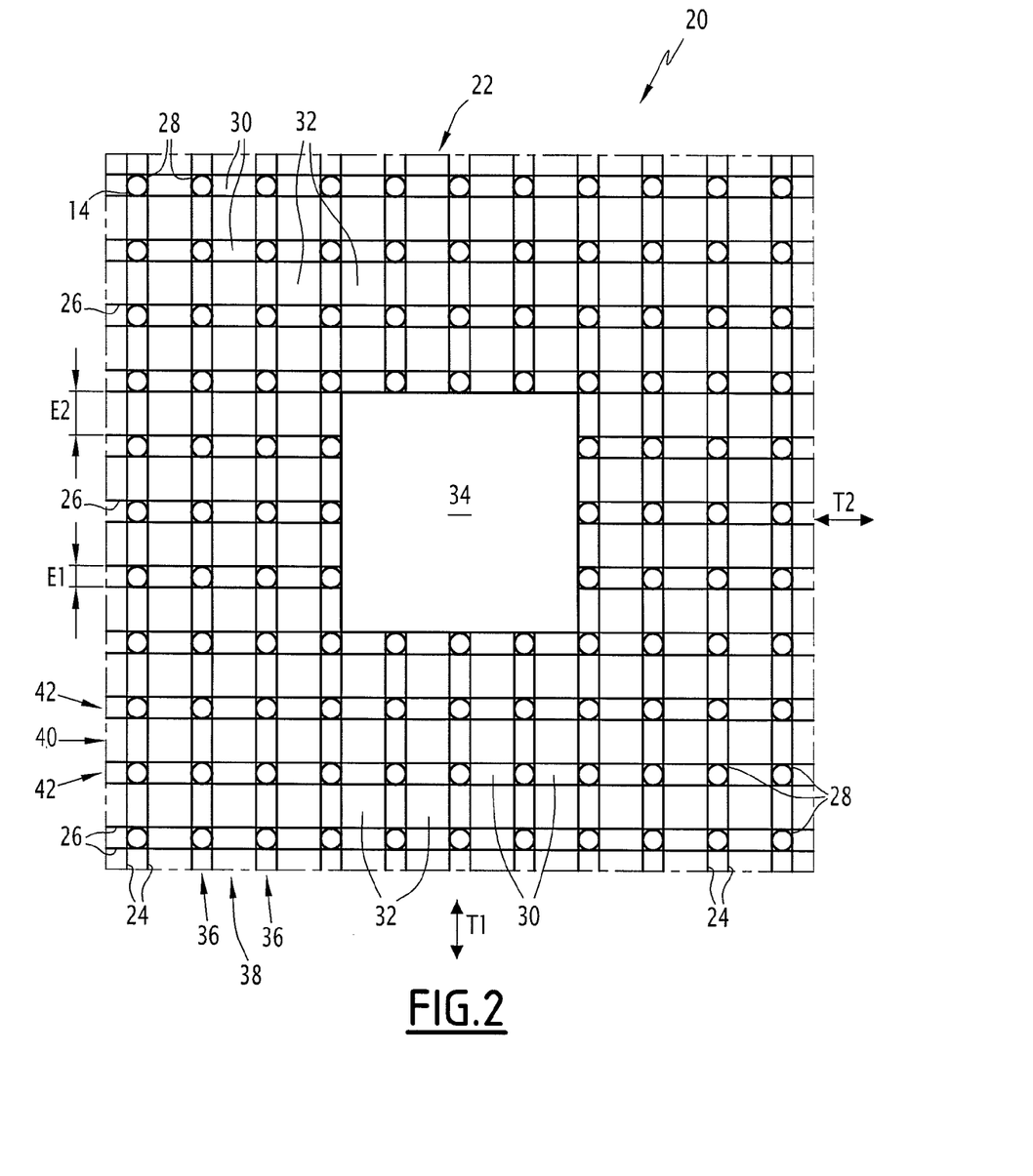
FIG. 2 is a top view of the tie plate.

As illustrated on FIG. 2, the upper nozzle 20 comprises a tie plate 22 formed by intersecting strips 24, 26 delimiting between them individual separate tubular guide cells 28 and tubular flow cells 30, 32 centered at nodes of a regular lattice. Each guide cell 28 is for receiving the upper end plug 14 of a respective fuel rod 4 (only one being represented for the sake of clarity). Each flow cell 30, 32 is for allowing coolant to flow through the tie plate 22. The tie plate 22 comprises a central aperture 34 for allowing the water channel 6 to extend through the tie plate 22. The central aperture 34 replaces guide cells 28 and flow cells 30, 32 in the lattice.

The tie plate 22 comprises two sets of strips 24, 26. The strips 24, 26 of each set are parallel and mutually spaced. The strips 24, 26 of each set intersect the strips of the other set at right angles thus delimiting the guide cells 28 and the flow cells 30, 32.

The tie plate 22 comprises a set of first strips 24 extending in a first transverse direction T1 and a set of second strips 26 extending in a second transverse direction T2 perpendicular to the first transverse direction T1.

Each guide cell 28 and each flow cell 30, 32 is delimited by the intersection of two adjacent first strips 24 with two adjacent second strips 26. Each guide cell 28 and each flow cell 30, 32 has four side walls each formed by a respective strip 24, 26.

Figure 3:
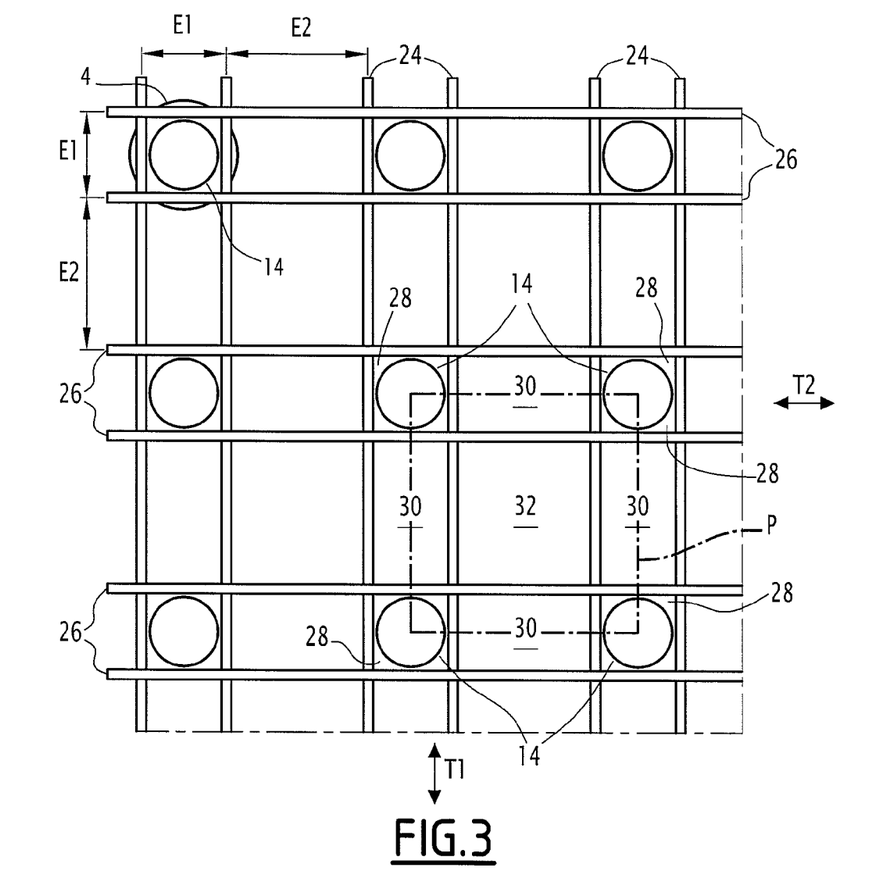
FIG. 3 is a partial top view of the tie plate.

As shown on FIG. 3 illustrating an enlarged partial view of the tie plate of FIG. 2, the guide cells 28 and flow cells 30, 32 are centered at nodes of a regular lattice defined by a repeating pattern P comprising four corner nodes in a square lattice arrangement and a center node at the center of the four corner nodes, with one guide cell at each corner node of the pattern P, separated by a pair of parallel spaced first strips 24 intersecting a pair of parallel spaced second strips 26 and a central flow cell 32 at the center node of the pattern P.

The central flow cell 32 is delimited by the intersection of the pair of first strips 24 and the pair of second strips 26. The central flow cell 32 has four side walls. Each side wall is defined by a portion of a respective one of the strips of the two intersecting pairs of first strips 24 and second strips 26.

The tie plate 22 further includes intermediate flow cells 30 between successive guide cells 28 in the repeating pattern P. More specifically, the pattern P comprises a 3×3 array of nodes in a square or rectangular lattice arrangement with four guide cells 28 at corner nodes, the central flow cell 32 at the center node and four intermediate flow cells 30 at intermediate side nodes.

Each intermediate flow cell 30 is delimited by two successive guide cells 28 in one transverse direction T1, T2 and by two successive central flow cells 32 in the other transverse direction T2, T1.

Each central flow cell 32 is surrounded by four guide cells 28 in a centered square pattern P: the four guide cells 28 form a square and the central flow cell 32 is at the center of the square. It is also surrounded by four intermediate flow cells 30 each delimiting one side of the central flow cell 32.

Guide cells 28 and flow cells 30, 32 of the pattern P are separated by two first strips 24 and two second strips 26 defining at their intersection at right angle the four-walled central flow cell 30.

Each guide cell 28 and each flow cell 30, 32 of the tie plate 22 is delimited by two pairs of intersecting strips 24, 26.

Each first strip 24 and each second strip 26 separates on a side a row of guide cells 28 alternating with intermediate flow cells 30 and on the other side a row of intermediate flow cells 30 alternating with central flow cells 32.

The pairs of parallel strips 24, 26 delimiting guide cells 28 between them have a small spacing E1 and the pair of parallel strips 24, 26 delimiting between them central flow cells 32 have a large spacing E2 larger that the small spacing E1.

Due to the different spacings E1, E2, the guide cells 28 and flow cells 30, 32 have different cross-sections. Guide cells 28 are identical and have a square-shaped cross-section. Central flow cells 32 are identical and have a square-shaped cross-section. The central flow cells 32 have a side dimension superior to that of the guide cells 28. Each central flow cell 32 has a cross-section area superior to that of each guide cell 28.

Each intermediate flow cell 30 has two parallel side walls each in common with an adjacent central flow cell 32 and two parallel side walls each in common with an adjacent guide cell 28. The intermediate flow cells 30 have rectangular-shaped cross-section. The short side walls are the side walls shared with the guide cells 28. Each intermediate flow cell 30 has a cross-section area superior to that of the guide cells 28.

Referring to FIG. 2, the guide cells 28 and flow cells 30, 32 of the tie plate 22 define in each transverse direction T1, T2 mixed rows 36 each comprising guide cells 28 alternating with intermediate flow cells 30, said mixed rows 36 alternating with flow rows 38 each exclusively comprising flow cells 30, 32, namely intermediate flow cells 30 alternating with central flow cells 32.

The tie plate 22 comprises first mixed row 36 and first flow rows 38 extending in the first transverse direction T1 and alternating in the second transverse direction T2 and second mixed rows 42 and second flow rows 40 extending in the second transverse direction T2 and alternating in the first transverse direction T1.

Each intermediate flow cell 30 is inserted between two guide cells 28 in a mixed row 36, 42 in one of the first and second transverse directions T1, T2. Each central flow cell 32 is located at the intersection of a first flow row 38 and a second flow row 40.

Each strip 24, 26 separates a mixed row 36, 42 and an adjacent flow row 38, 40. Each first strip 24 separates a first mixed row 36 and a first flow row 38 and each second strip 26 separates a second mixed row 42 and a second flow row 40.

The tie plate 22 comprises two strips between each pair of adjacent mixed rows in the first direction T1 and in the second direction T2. So, each pair of adjacent first mixed rows 36 are separated by two parallel spaced first strips 24 and each pair of adjacent second mixed rows 42 are separated by two parallel spaced second strips 26.

In each transverse direction T1, T2, the spacing between the strips 24, 26 is regular and alternatively large and small: in each transverse direction T1, T2 the tie plate 22 has the small spacing E1 between each pair of parallel adjacent strips 24, 26 delimiting between them a mixed row 36, 42 and the large spacing E2 between each pair of parallel adjacent strips 24, 26 delimiting between them a flow row 38, 40. The small spacing E1 is smaller than the large spacing E2.

Figure 4:
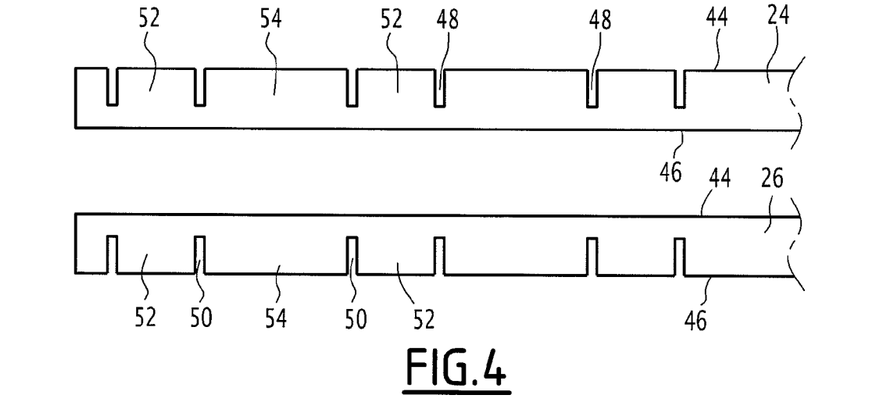
FIG. 4 is a partial front view of strips of the tie plate.

FIG. 4 illustrates a front view of a first strip 24 and a second strip 26 of the tie plate 22. First strips 24 and second strips 26 have upper edges 44 and lower edges 46. First strips 24 and second strips 26 are provided with interconnection slots 48, 50 formed in their edges. The first strips 24 are provided with slots 48 in their upper edge 44 and the second strips 26 are provided with slots 50 in their lower edge 46. When the tie plate 22 is assembled, strips 24, 26 are connected by interfitting the slots 48, 50.

Slots 48, 50 define along each strip 24, 26 guide cell portions 52 alternating with flow cell portions 54. Each guide cell portion 52 forms a side wall separating a guide cell 28 from an intermediate flow cell 30 and each flow cell portion 54 forms a side wall separating an intermediate flow cell 30 and a central flow cell 32 when the tie plate 22 is assembled. Each guide cell 28 is delimited by four guide cell portions 52, each central flow cell 32 is delimited by four flow cell portions 54 and each intermediate flow cell 30 is delimited by two opposed guide cell portions 52 intersecting perpendicularly two opposed flow cell portions 54.

As illustrated on FIG. 1, the fuel rod upper end plugs 14 have a diameter inferior to that of the fuel rods 4. Hence, the tie plate 22 can be provided with guide cells 28 of small cross-section and flow cells 30, 32 of large cross-section. This namely provides central flow cells 32 of large cross-section delimited by two pairs of intersecting strips at the center of each group of four guide cells 28 defining a square and in addition intermediate flow cells 30 between the guide cells 28 around the central flow cell 32. This pattern P allows low pressure drop.

The tie plate 22 is formed by mutually spaced intersecting strips. This allows obtaining a tie plate 22 with high strength. It is possible to use strips made of metal with high mechanical characteristic, such as Ni-based alloy, martensitic or precipitation-hardening stainless steel, thus allowing the use of thin strips and reducing even more the pressure drop. To even decrease the pressure loss of the tie plate 22, the lower edges 46 and/or upper edges 44 of the strips 24, 26 may be chamfered or rounded for instance mechanically or via electron beam/laser.

The tie plate 22 further allows efficient guiding of the fuel rod end plugs between four side walls with easier manufacturing operations and geometrical controls with respect to providing guide cells and flow cells by drilling holes and flow channels in a massive plate. In addition, owing to the reduced cross-section areas of the flow cells 30, 32 compared to the flow channels drilled in a massive plate, the tie plate 22 allows mitigating the entry of debris and foreign material into the fuel assembly 2 through the upper nozzle 20 especially during non-operating conditions such transport, storage and handling or at the shut-down of the reactor when the coolant stops flowing upwardly. It prevents specifically large debris (more than several mm) to fall into the fuel assembly 2.

In the embodiment of FIGS. 2-4, the guide cell portions 52 are planar. Each guide cell 28 is thus delimited by four planar side walls.

Preferably, each guide cell 28 has transverse dimensions allowing to receive a fuel rod end plug 14 with a transverse clearance. Alternatively, each guide cell 28 has transverse dimensions to allow a linear contact of at least two opposed side walls with the fuel rod end plug 14.

Advantageously, each strip 24, 26 is planar to limit flow resistance. Strips 24, 26 can thus be obtained economically e.g. by cutting a metal sheet while obtaining a tie plate 22 exhibiting low pressure drop and high strength.

Figure 5:
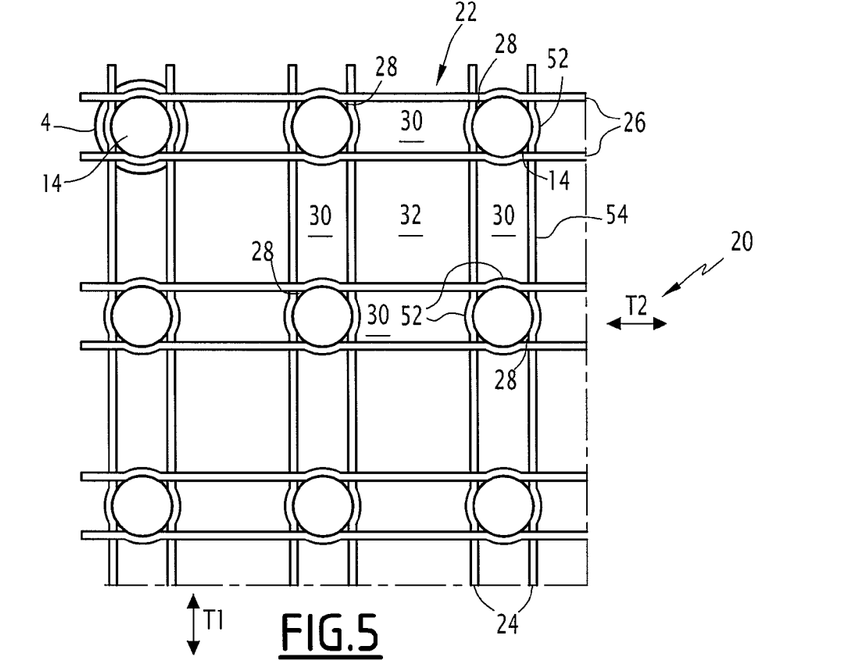
FIG. 5 is a partial top view of a tie plate according to another embodiment.

In the embodiment of FIG. 5 illustrating a partial top view of a tie plate 22, each guide cell portion 52 is curved outwardly with respect to the guide cell 28 delimited by the guide cell portion 52 such that each guide cell 28 exhibits a substantially circular cross-section closely matching the outer surface of a fuel rod upper end plug 14 extending through the guide cell 28. With respect to the embodiment of FIGS. 2-4, the cross-section area of the central flow cells 32 is increased relatively to the cross-section areas of the intermediate flow cells 30 and guide cells 28.

Figure 6:
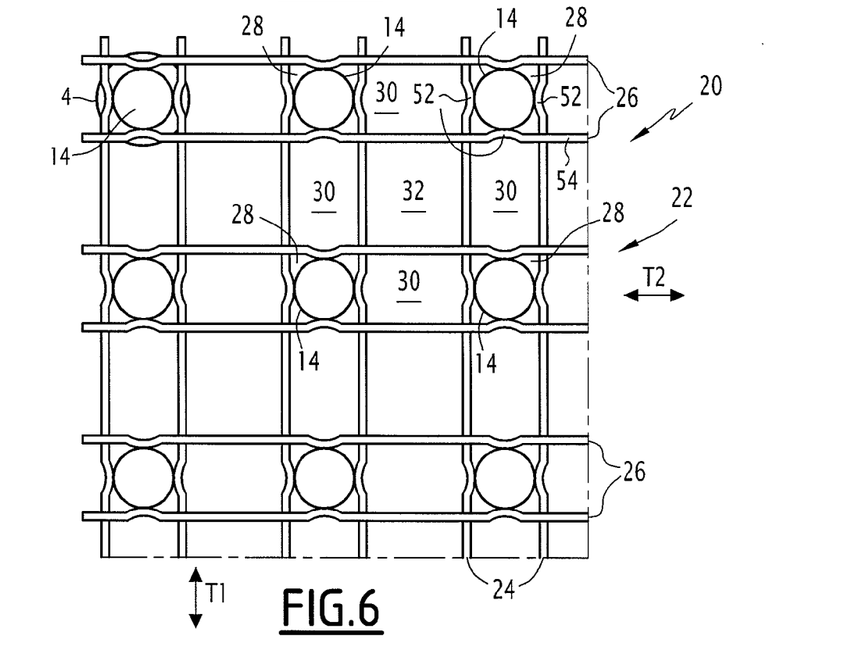
FIG. 6 is a partial top view of a tie plate according to another embodiment.

In the embodiment of FIG. 6 illustrating a partial top view of a tie plate 22, each guide cell portion 52 is curved inwardly with respect to the guide cell 28 delimited by the guide cell portion 52 such as to be in linear contact with a fuel rod upper end plug 14 extending through the guide cell 28. The cross-sections of the central flow cells 32 are reduced, improving debris and foreign material retaining on the tie plate 22.

Figure 7:
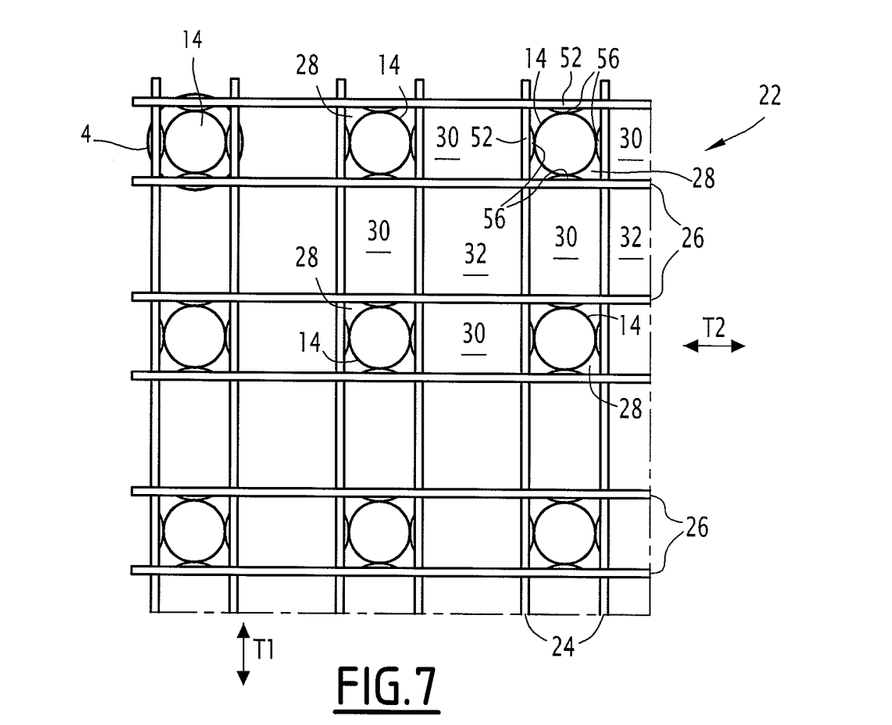
FIG. 7 is a partial top view of a tie plate according to another embodiment.
Figure 8:
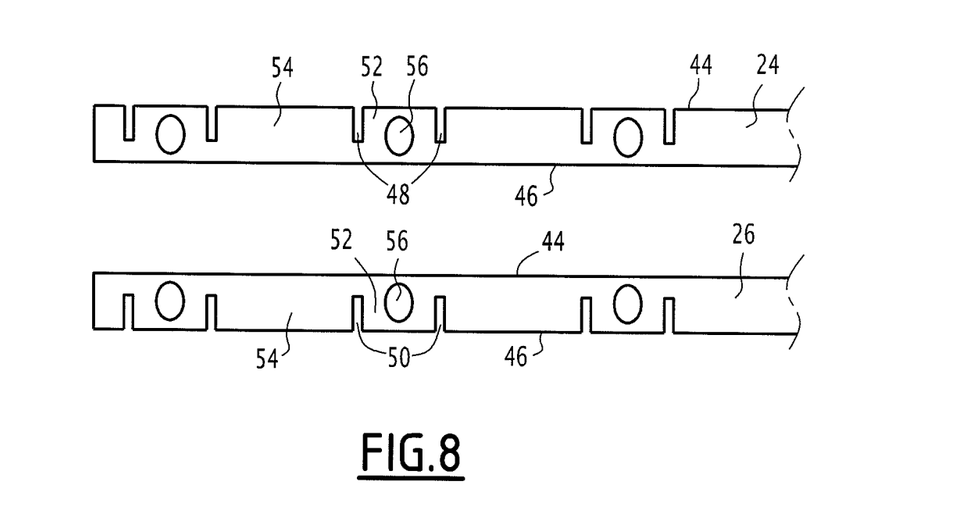
FIG. 8 is a partial front view of strips of the tie plate of FIG. 7.

In the embodiment of FIGS. 7 and 8 illustrating a partial top view of a tie plate 22 and front views of strips 24, 26 of the tie plate 22, guide cell portions 52 of the strips 24, 26 are formed with dimples 56 protruding inwardly with respect to the guide cells 28. Each dimple 56 is formed (e.g. stamped) in the corresponding guide cell portion 52. Each dimple 56 is formed to define contact area of the guide cell portion 52 with a fuel rod upper end plug 14 extending through the corresponding guide cell 28. Each dimple 56 is formed in the corresponding guide cell portion 52 between the lower edge 46 and the upper edge 44 of the strip 24, 26. The dimples 56 allow increased transverse support of the upper end plugs 14 of the fuel rods 4.

Figure 9:
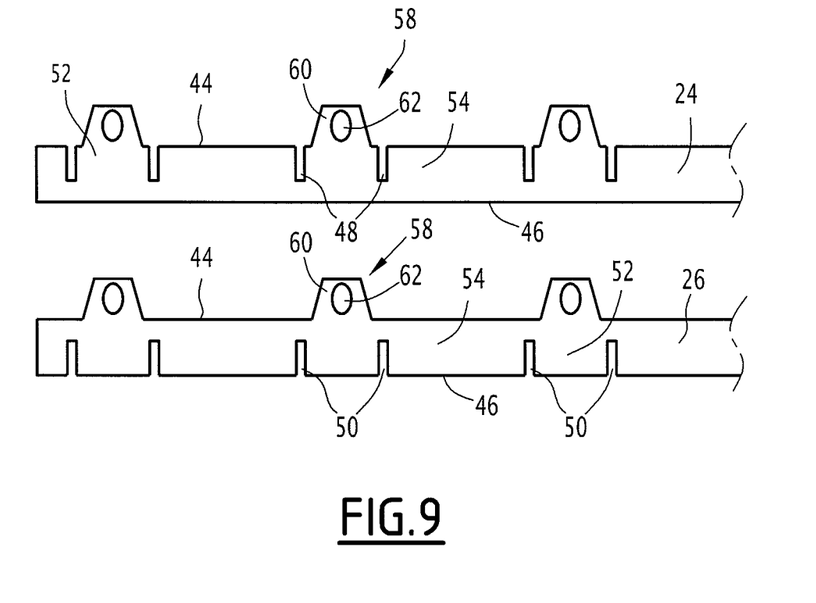
FIG. 9 is a partial front view of strips of a tie plate according to another embodiment.

In the embodiment of FIG. 9 illustrating front views of strips 24, 26 of a tie plate 22, the strips 24, 26 are formed with elastically deformable springs 58 extending from edges of the strips 24, 26, here upper edges 44, in register with the guide cell portions 52. Each spring 58 extends from a guide cell portion 52 and is for contacting a fuel rod end plug extending through a guide cell 28 delimited by guide cell portion 52 and transversely positioning the corresponding fuel rod 4. Each spring 58 comprises an elastically flexible tab 60 extending from a guide cell portion 52 and a rigid contact protrusion 62 formed in the tab 60 for contacting a fuel rod end plug extending through the corresponding guide cell 28 delimited by the guide cell portion 52. This embodiment may be used for instance to secure the upper end plugs 14 of the fuel rods 4 in tie plate 22.

Embodiments allowing a linear contact or a contact area of each side wall of a guide cell 28 with the fuel rod en plug 14 improve guiding of the fuel rod end plug 14 and prevent fretting between the end plugs 14 and the tie plate 22.

If fuel rods of different lengths are provided in the fuel assembly 2, the part-length fuel rods are usually secured at their lower end by the lower tie plate, while their upper end held in position by the corresponding spacer grids 16. The guide cells 28 positioned above the part-length fuel rods have the geometry of the other guide cells 28 of the tie plate 22 but act as flow cells.

The invention applies in particular to an upper tie plate, specifically for a BWR nuclear fuel assembly tie plate. More generally, it applies to nozzles, namely lower nozzles and upper nozzles.

What is claimed is:

1. A nuclear fuel assembly tie plate comprising: intersecting strips delimiting therebetween tubular guide cells each for allowing a fuel rod to extend through the tie plate, the strips delimiting therebetween tubular flow cells separate from the guide cells, each flow cell for allowing coolant flow through the tie plate, the guide cells and flow cells being arranged at nodes of a lattice defined by a repeating pattern comprising four corner nodes in a square lattice arrangement and a central node at the center of the four corner nodes, with one of the guide cells at each corner node, the guide cells at the corner nodes separated by a first pair of parallel spaced strips of the intersecting strips intersecting a second pair of parallel spaced strips of the intersecting strips, the first and second pairs of parallel strips delimiting a four-walled central flow cell at the center node, the repeating pattern being a 3×3 array of nodes in a square or rectangular lattice arrangement with the four guide cells at the corner nodes, the central flow cell at the center node and four intermediate flow cells at four intermediate side nodes between the corner nodes; and wherein the guide cells and flow cells positioned at the nodes of the repeating pattern are delimited between a group of four parallel strips of the intersecting strips intersecting a group of four parallel strips of the intersecting strips, wherein in each group the spacing between the pairs of strips delimiting the central flow cell between them greater than the spacing between the pair of strips delimiting the guide cells between them.

2. The fuel assembly tie plate according to claim 1, wherein the central flow cell has a cross-sectional area greater than that of each guide cell.

3. The fuel assembly tie plate according to claim 1, wherein each guide cell has a square-shaped cross-section.

4. The fuel assembly tie plate according to claim 1, wherein each central flow cell has a square-shaped cross-section.

5. The fuel assembly tie plate according to claim 1, wherein each intermediate flow cell has a cross-sectional area greater than that of the guide cells.

6. The fuel assembly tie plate according to claim 1, wherein each intermediate flow cell has a rectangular-shaped cross-section.

7. The fuel assembly tie plate according to claim 1, wherein the intersecting strips have planar guide cell portions delimiting guide cell side walls.

8. The fuel assembly tie plate according to claim 1, wherein the intersecting strips have guide cell portions delimiting guide cell side walls curved inwardly with respect to the guide cell.

9. The fuel assembly tie plate according to claim 1, wherein the intersecting strips have guide cell portions delimiting guide cell side walls curved outwardly with respect to the guide cell.

10. The fuel assembly tie plate according to claim 1, wherein the intersecting strips have guide cell portions delimiting guide cell side walls provided with dimples protruding from the guide cell portion inwardly in the corresponding guide cell.

11. A nuclear fuel assembly comprising the tie plate according to claim 1.

12. A nuclear fuel upper nozzle comprising the tie plate according to claim 1.

13. A nuclear fuel assembly comprising:
the upper nozzle according to claim 12; and
a bundle of fuel rods, at least one of the guide cells receiving a fuel rod with a transverse clearance between the fuel rod and guide cell side walls of the at least one guide cell.

* * * * *